Oct. 8, 1968 D. J. KELLEY 3,405,375
STRIPLINE VARIABLE PHASE SHIFTER HAVING MEANS TO MAINTAIN A CONSTANT CHARACTERISTIC IMPEDANCE
Filed May 24, 1966
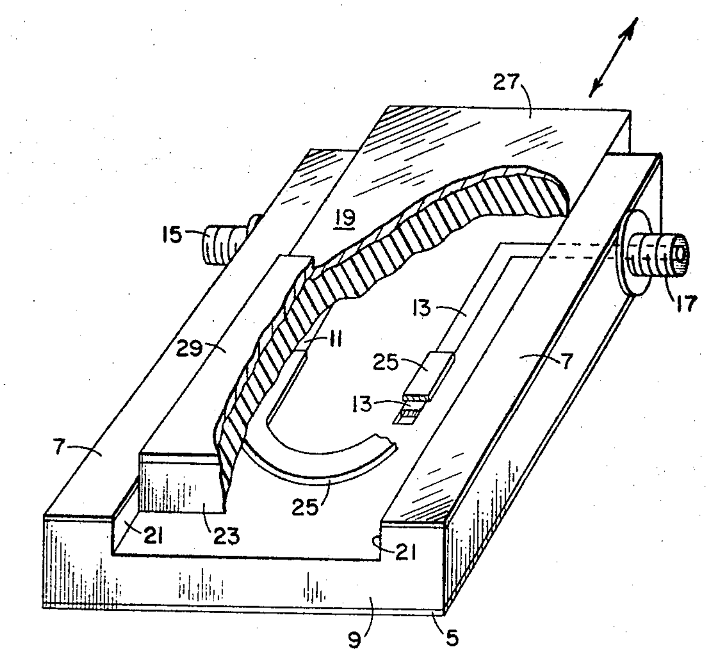
Douglas J. Kelley,
INVENTOR.
BY Harry M. Saragovitz
Edward J. Kelly
Herbert Berl
Jack H. Voigt

United States Patent Office 3,405,375

Patented Oct. 8, 1968

3,405,375

STRIPLINE VARIABLE PHASE SHIFTER HAVING MEANS TO MAINTAIN A CONSTANT CHARACTERISTIC IMPEDANCE

Douglas J. Kelley, Lexington, Mass., assignor, by mesne assignments, to the United States of America as represented by the Secretary of the Army Filed May 24, 1966, Ser. No. 552,647

1 Claim. (Cl. 333—31)

This invention relates generally to a microwave printed circuit phase shifter and more specifically to an adjustable phase shifter which physically reduces the transmission path length between two fixed points within a stripline circuit in such a manner that electrical discontinuities are minimized.

In the old conventional printed circuit phase shifter or trimmer, a slider is set on a stripline circuit board with its U-shaped transmission line in both physical and electrical contact with transmission lines etched on a stripline circuit board. The package is completed by the addition of a ground plane which has been machined to allow the slider to be adjustable in position. By adjusting the slider position, one can shorten or lengthen the total transmission line length of the package which, in turn, will create a corresponding change in the phase of the output signal. In the conventional trimmer, the ground planes are balanced ground planes (inner conductor symmetrically located between outer conductors) and require that image circuitry transmission lines be the same width. The problems associated with this configuration are mainly two-fold; exact alignment of the transmission lines is necessary to avoid electrical discontinuities, and adjusting the slider results in two sections of mirror image transmission line that vary in length, thus producing a variable discontinuity.

In strip transmission lines, the width of the conductor influences the impedance of the package. If two conductors of the same width are exactly superimposed one on another, there will be a slight change in impedance from that of a single conductor because of the finite thickness of the metal conductors. If, on the other hand, the superimposed conductors are misaligned, then the effective conductor width will be increased by the amount of misalignment. This increase in width will reduce the impedance which, in turn, will produce an electrical discontinuity. A few thousandths of an inch misalignment will create a measurable change in impedance. Fabrication tolerances would be unrealistic if perfect alignment were attempted. The usual practice is to compromise between mechanical tolerances and electrical performances. Therefore, one disadvantage of the old method is that fabrication tolerancing severely limits electrical performance.

A second disadvantage of the old method is that the presence of mirror image sections of line in the overlapped region of the circuit results in a slightly lower impedance due to the finite thickness of the metal conductor. If the length of the overlapped line were held constant, the impedance could be raised to its proper level by decreasing the width of the conductors in the mirror image area. Because of the adjustable nature of this device, the extent of overlap varies as the phase is adjusted, hence, compensating the line widths will be effective for only one position of the slider. Because of this variable overlap, the discontinuity introduced will be related to the length of the mirror image section and will extend from a minimum as this length approaches one-half wavelength or multiple thereof to a maximum at one-quarter wavelength or odd multiple thereof. From the above, it can be seen that this type of trimmer, when adjusted for any sizeable phase-shift will produce internal reflections that are detrimental to the electrical performance desired.

Thus, it is an object of this invention to provide a printed circuit phase shifter having an unbalanced stripline structure which overcomes the disadvantages outlined above.

Another object of this invention is to provide a printed circuit phase shifter which has a constant impedance over the entire range of phase variation.

Further, it is an object of this invention to provide a printed circuit phase shifter which is cheaper to manufacture due to the fact that mechanical tolerances are not as critical as in previously made printed circuit phase shifters.

Other objects, features, and advantages of this invention, and a better understanding of its construction and operation, will be apparent from the following detailed description, taken in conjunction with the single figure which is a perspective view partially cut away to show the inner conductors.

Referring now to the drawing, the printed circuit phase shifter comprises a first ground plane formed by planar conductor 5 and a second ground plane formed by planar conductor 7 which is disposed in parallel with planar conductor 5. A first structural dielectric 9 is provided between planar conductors 5 and 7 for insulating and spacing conductors 5 and 7 from each other. A pair of L-shaped, elongated, inner, planar conductors 11 and 13 are provided intermediate the planes of conductors 5 and 7 and partially embedded within dielectric 9 with one end of each of conductors 11 and 13 in parallel with respect to each other while the other ends of conductors 11 and 13 are extended one out each side of dielectric 9 and connected respectively to the inner conductors of coaxial connectors 15 and 17, the outer conductors of which are connected to planar conductors 5 and 7 forming a printed circuit board.

An elongated channel 21 is provided in dielectric 9, the depth of which is coincident with the plane of the inner planar conductors 11 and 13. A dielectric slider 19 is disposed in channel 21 for longitudinal movement therein. The slider 19 comprises a second structural dielectric 23, a U-shaped planar conductor 25 etched onto the lower portion of slider 19 and is superimposed on planar conductors 11 and 13 when slider 19 is placed into channel 21. Slider 19 has a third planar conductor 27 which is coplanar with planar conductor 7 and a fourth planar conductor 29 which is electrically connected to conductor 27 but elevated with respect to conductor 27 forming a third ground plane.

*Operation*

Slider 19 is positioned variably according to the phasing desired in channel 21 with conductor 25 superimposed on conductors 11 and 13, and the phase of signals traveling through the board is shifted according to the positioning of slider 19. With planar conductor 29 of slider 19 being disposed over the area of conductor 25 and being elevated to provide a thicker dielectric area over conductor 25 provides an electrically unbalanced slider 19. The use of an unbalanced slider allows the width of the U-shaped conductor 25 to be increased while still maintaining a constant impedance within the package, and the impedance of the image circuitry is determined primarily by conductor 25, thus the impedance is constant over the entire range of phase variation. By balancing only one side of the area of dielectric in the vicinity of the wider U-shaped conductor 25 by a factor of two, the width of the conductor 25 would only have to be increased approximately half as much to return to the original impedances. The ability to increase the U-shaped conductor 25 width and yet maintain the original impedance has the advantage of making the accurate alignment of conductors unnecessary. When the wider line is superimposed on the narrower line, it is at the edge of the wider line that the fringing electrical field is established in respect to the ground plane. The narrow conductors 11 and 13 are in a sense masked out and their alignment centrally with the wider conductor 25 does not become electrically critical until the misalignment is such that the edges of the narrow conductors 11 and 13 are nearly tangent to the edge of the wider conductor 25. Thus, if the wider conductor 25 is made more than a few thousandths of an inch wider than conductors 11 and 13, then the tolerable misalignment in one direction will be proportional to about one-half the excess over a few thousandths, i.e., 0.130 inch wide (50 ohms) slider circuit superimposed on 0.096" wide (50 ohms) circuit board will allow approximately ±0.015 inch misalignment with negligible effect on the electrical performance. The ability to tolerate such misalignment makes it possible to fabricate units without compromising on electrical performance.

The actual configuration of the etched transmission lines need not be confined to that discussed above but may be etched in any layout which would permit a section of transmission line to be superimposed such that a break in a second transmission line is bridged. The mechanical means of adjusting the slider can take on many forms from something as simple as grasping the end of the slider 19 with the fingers to move the slider back and forth to a complicated mechanism designed to exert constant pressure on the slider 19 while providing a fine adjustment capability.

As discussed above, this phase shifter package is fitted with coaxial adaptors in and out of the package which is one way of packaging the device. Other ways would be to have the input terminals as stripline lap-joint connections or as transitions to wave guide, slab-line or any other form of transmission line. The shifter can be incorporated in larger stripline packages along with other stripline circuitry such as power dividers, filters, delay lines, switch bits, etc.

While the invention has been described with reference to a preferred embodiment thereof, it will be apparent that various modifications and other embodiments thereof will occur to those skilled in the art in light of the instant disclosure. Accordingly, it is desired that the scope of this invention be limited only by the appended claim.

What is claimed is:

1. A printed circuit phase shifter comprising: a first planar conductor providing a first ground plane; a second planar conductor disposed in parallel with said first planar conductor providing a second ground plane; a first structural dielectric disposed between said first and second planar conductors; a pair of elongated, inner, planar conductors disposed in an inner plane intermediate said first and second ground planes, said planar conductors and said first dielectric forming a printed circuit board, one end of each of said inner planar conductors being in parallel relationship with each other; each of said inner planar conductors being connected to a transmission line connector means for connecting said phase shifter in a transmission line system, said printed circuit board having an elongated channel the depth of which is coincident with said plane of said pair of inner conductors; a dielectric slider disposed for sliding movement in said channel; a generally, U-shaped, elongated, inner conductor disposed on a lower surface of said slider superimposed on, slidably engaging said pair of inner planar conductors, said U-shaped inner conductor being substantially wider than said parallel inner conductors so as to make the impedance of said phase shifter primarily that of said U-shaped conductor, thus allowing said phase shifter to maintain a constant impedance over the entire range of phase variations, said slider having a third planar conductor being coplanar with said second ground plane, said slider means having a fourth planar conductor electrically connected to said third planar conductor and being in a plane elevated with respect to said second ground plane and extending over the area occupied by said U-shaped inner conductor for providing an unbalanced ground plane for said U-shaped inner conductor with respect to said pair of inner conductors and a second structural dielectric disposed on said third and fourth planar conductors of said slider and forming said lower surface of said slider.

References Cited

UNITED STATES PATENTS

| | | | |
|---|---|---|---|
| 2,810,892 | 10/1957 | Blitz. | |
| 3,117,379 | 1/1964 | Ayer. | |
| 3,139,597 | 6/1964 | French et al. | 333—31 |

HERMAN KARL SAALBACH, *Primary Examiner.*

P. L. GENSLER, *Assistant Examiner.*